3,511,764
CROSSLINKED POLYACRYLAMIDE FOAM
Nelson S. Marans, Silver Spring, and Stephen J. Olfky, Ellicott City, Md., assignors to W. R. Grace & Co., New York, N.Y., a corporation of Connecticut
No Drawing. Filed Mar. 23, 1967, Ser. No. 625,294
Int. Cl. C08d 1/00; C08f 1/16; C08j 1/18
U.S. Cl. 204—159.21                    3 Claims

ABSTRACT OF THE DISCLOSURE

A crosslinked polyacrylamide foamed by the decomposition product of polyoxymethylene. Acrylamide and trioxane are blended, irradiated, heated to complete polymerization and then heated to a higher temperature to decompose the polyoxymethylene.

---

The present invention relates to a novel and useful foamed product and a process for preparing the product. More particularly, it relates to foamed crosslinked polyacrylamide and a process for forming the product.

It is known in the art that various materials may be used as foaming agents for plastics. In general, the plastics are foamed by mixing a blowing agent with the polymer and then heating the mixture to a temperature sufficient to decompose or expand the blowing agent. In the present invention the monomers are mixed, polymerized and then heated to decompose one of the polymers. Accordingly, it is an object of the present invention to provide a crosslinked polymer which is foamed by the decomposition product of another polymer. Another object is to provide a process of forming a uniform closed cell foam. Other objects will become apparent as the description of the invention proceeds.

These objects are accomplished by the present invention which provides a crosslinked polyacrylamide foamed by the decomposition product of polyoxymethylene.

In a preferred embodiment of the present invention, the acrylamide has the formula

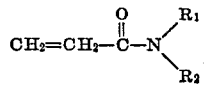

wherein $R_1$ and $R_2$ are individually selected from the group consisting of hydrogen and alkyl groups of from 1 to about 12 carbon atoms.

The present invention also provides a method for preparing a foamed crosslinked polyacrylamide which comprises mixing an acrylamide and trioxane, irradiating the mixture at a dosage of from about 0.1 to about 20 megarads, heating the mixture to a temperature of from about 35° C. to about 65° C. to cause polymerization of both materials and thereafter heating the mixture to a temperature above about 125° C. to decompose the polyoxymethylene and form the polyacrylamide into a foam.

The acrylamides useful in the practice of the present invention have the basic formula

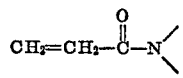

The preferred acrylamides are those containing hydrogen and alkyl radicals of from 1 to about 12 carbons atoms as nitrogen substituents. Among the various acrylamides which are suitable are N-methyl acrylamide,
N,N-dimethyl acrylamide,
N-propyl acrylamide,
N-pentyl acrylamide,
N,N-dibutyl acrylamide,
N,N-dipentyl acrylamide,
N-phenyl acrylamide,
N,N'-ethylene(diacrylamide),
N-n-dodecyl acrylamide,
N-cyclohexyl acrylamide,
N,N-dicyclohexyl acrylamide, and
N-3-oxo-1,1-dimethyl-butyl acrylamide.

Other suitable materials are disclosed in U.S. Pat. 3,277,056.

In general, from about 0.1 to about 20 megarads of high energy ionizing irradiation may be used to form the active polymer sites in the trioxane and acrylamide. The high energy ionizing irradiation may be electrons, deuterons, positrons, alpha particles, X-ray and gamma rays having sufficient energy to induce active sites in the trioxane. Preferably, the source of irradiation will be a conventional Van de Graaff accelerator. The trioxane is irradiated in the solid state, that is, at a temperature below the melting point of the trioxane. Conveniently, the irradiation is conducted at room temperature.

After irradiation, the trioxane is heated to a temperature of from about 35° C. to about 65° C., preferably from about 40° C. to about 60° C. to achieve polymerization of the trioxane and the acrylamide. The materials are maintained at the desired temperature for a period of from about 1 minute to 10 hours, preferably 5 minutes to 1 hour, to accomplish polymerization.

The non-reacted trioxane and acrylamide are removed by evaporation or by extraction with a solvent such as water, methanol or acetone. The monomers may, of course, be recycled.

The polyoxymethylene, which is formed from the trioxane, decomposes at a temperature above about 125° C. to form the foam. Preferably, the decomposition is accomplished at a temperature of from about 140° C. to about 300° C. More preferably, a temperature of from about 170° C. to about 250° C. is utilized so that the decomposition takes place in a matter of 10 minutes or less. The decomposition is, of course, a time-temperature relationship and longer periods will be required at lower temperatures.

The trioxane and acrylamide may be utilized in any proportion. When a more foamed product is desired more of the polyoxymethylene must be employed.

In a variation of the process of the present invention polyoxymethylene is directly mixed with the acrylamide. In this case, the irradiation merely causes active sites in the acrylamide since the trioxane has already been polymerized. In such cases, the mixture may be directly heated to the more elevated temperature to decompose the polyoxymethylene.

The foamed product of the present invention is a closed cell structure i.e., it has a solid matrix with bubbles. The polyacrylamide foam swells in water but does not dissolve which shows that the product is crosslinked.

The following examples are given to illustrate the invention and are not intended to limit it in any manner. All parts are given in parts by weight unless otherwise expressed.

EXAMPLE 1

A sheet approximately 100 mils in thickness is formed by intimately mixing 18.8 grams of −10 +100 mesh trioxane with 20.25 grams of −40 +60 mesh acrylamide and pressing the mixture for about 5 minutes in a conventional Carver press at a temperature of 25° C. and a pressure of 2000 pounds/square inch. The resulting sheet is subjected to an irradiation dose which comprise negarad of 2 mev. electrons as delivered by a contional Van de Graaff accelerator. The sheet is twice ed through a beam of 0.5 megarad while the sample t a temperature of 55° C. The resulting sheet is hed with water to leach out any monomers remaining. sheet is dried by washing it with acetone. The sheet ien placed in a drying oven at a temperature of approximately 100° C. to flash out the remaining acetone the temperature of the oven is raised to 173° C. At higher temperature the sheet foams to a thickness of it 1 inch. The foam density is 0.145 gram/cm.³.

EXAMPLE 2 sheet of acrylamide is formed by melting 20.25 is commercial acrylamide and pouring it into an aluum foil-lined petri dish 14 cm. in diameter. The same edure is repeated using 18.8 grams of trioxane in a nd dish. The two sheets, each of which are about 50 in thickness, are pressed together in a Carver press 5° C. and a pressure of 2000 pounds/square inch for it 5 minutes. The composite sheet which is about 100 in thickness is aged for a period of 24 hours at room ierature. The composite sheet in which the monomers diffused into each other are then subjected, in one to an irradiation dosage comprising 1 megarad at ev. electrons as delivered by a conventional Van de iff accelerator. The sample is aged for 4 hours at C. to accomplish polymerization. The sample is ied with water to remove any remaining monomer then washed with acetone. The sample is dried at 1 temperature to give a hard film of 20.69 grams h represents a 54.2% conversion. From previous exnents it is known that acrylamide polymerization r the same conditions gives 88.6% conversion. Asng this conversion for the acrylamide in the mixthe percentage conversion for trioxane is 14.6%.

ie sheet, which is about 50 mils in thickness, is cut ve a sample of 0.5055 grams. It is then placed in a entional Carver press with the plates initially about . apart. The temperature of the press is 173° C. and ie sample expands the press is opened. The final ht of the sheet is 0.4879 which represents a weight of 3.48% while heating. The foam density is 0.146 /cm³. The cells are at most a few tenths of a millir in diameter.

ie sheet is cut to give another sample weighing 0.6191 . It is heated as above at a temperature of 235° C. final weight is 0.5488 gram with a weight loss of . The foam density is 0.078 gram/cm.³.

e sheet is then cut to give another sample weighing 10 gram. It is heated above at a temperature of C. The final weight is 0.3961 gram with a weight of 10.59%. The foam density is 0.081 gram/cm.³.

EXAMPLES 3 AND 4 e procedure of Example 1 is repeated employing lodecyl acrylamide and N-3-oxo-1,1-dimethyl-butylamide. Substantially the same results are obtained.

While in the above examples only unmodified compositions are employed, it is obvious that other materials such as dyes, pigments, fibers, fillers, plasticizers and the like may be introduced into the composition without substantial alteration of the desired physical properties.

The product of the present invention is useful as a packing material, insulation, water absorption material and the like.

Many equivalent modifications and variations of the present invention will be apparent to those skilled in the art from a reading of the foregoing without a departure from the inventive concept.

What is claimed is:

1. A method for preparing a foamed crosslinked polyacrylamide which comprises:
   (A) mixing 20.25 parts by weight of an acrylamide selected from the group consisting of N-methyl acrylamide, N,N-dimethyl acrylamide, N-propyl acrylamide, N-pentyl acrylamide, N,N-dibutyl acrylamide, N,N-dipentyl acrylamide, N-phenyl acrylamide, N,N'-ethylene(diacrylamide), N-n-dodecyl acrylamide, N-cyclohexyl acrylamide, N,N-dicyclohexyl acrylamide, and N-3-oxo-1,1-dimethyl-butyl acrylamide, per 18.8 parts by weight of trioxane;
   (B) irradiating a sheet of the mixture of (A) with a dosage of from about 0.1 to about 20 megarads;
   (C) heating the irradiated sheet (B) for a period of about 1 minute to about 10 hours at a temperature of from about 35° C. to about 65° C. to effect polymerization of both materials without effecting copolymerization thereof and thereafter;
   (D) heating the mixture (C) to a temperature above about 125° C. to decompose the polyoxymethylene component and form the polyacrylamide component into a foam.

2. The method of claim 1 wherein the mixture is heated at a temperature of from about 40° C. to about 60° C.

3. The method of claim 2 wherein the mixture is heated for a period of from about 5 minutes to about 1 hour.

References Cited

UNITED STATES PATENTS

| 2,990,381 | 6/1961 | Meinel | 260—2.5 |
| 3,281,499 | 10/1966 | Dolce et al. | 260—874 |
| 3,290,261 | 12/1966 | Goldblum | 260—2.5 |
| 3,346,663 | 10/1967 | Kern et al. | 260—823 |

FOREIGN PATENTS

| 939,475 | 10/1963 | Great Britain. |
| 984,322 | 2/1965 | Great Britain. |
| 1,368,383 | 6/1964 | France. |

MURRAY TILLMAN, Primary Examiner

M. FOELAK, Assistant Examiner

U.S. Cl. X.R.

204—159.22; 260—2.5, 874